US 8,387,760 B2

(12) United States Patent
Gherardi et al.

(10) Patent No.: US 8,387,760 B2
(45) Date of Patent: Mar. 5, 2013

(54) BELL-BAND DRIVE CONNECTION FOR DISC BRAKE

(75) Inventors: Pierangelo Gherardi, Zogno (IT); Andrea Recla, Milan (IT)

(73) Assignee: Freni Brembo S.p.A., Curno (IT)

( * ) Notice: Subject to any disclaimer, the term of this patent is extended or adjusted under 35 U.S.C. 154(b) by 702 days.

(21) Appl. No.: 12/159,063

(22) PCT Filed: Dec. 29, 2005

(86) PCT No.: PCT/IT2005/000777
§ 371 (c)(1),
(2), (4) Date: Jun. 24, 2008

(87) PCT Pub. No.: WO2007/074488
PCT Pub. Date: Jul. 5, 2007

(65) Prior Publication Data
US 2008/0314703 A1    Dec. 25, 2008

(51) Int. Cl.
*F16D 65/12* (2006.01)
*B60T 1/06* (2006.01)
(52) U.S. Cl. ............................. 188/218 XL; 188/18 A
(58) Field of Classification Search ............ 188/218 XL, 188/18 A, 26
See application file for complete search history.

(56) References Cited

U.S. PATENT DOCUMENTS

| 2005/0145452 A1* | 7/2005 | Yamamoto ............... 188/218 XL |
| 2005/0284712 A1* | 12/2005 | Cornolti et al. ......... 188/218 XL |
| 2006/0000680 A1* | 1/2006 | Carminati et al. ....... 188/218 XL |
| 2007/0215418 A1* | 9/2007 | Wirth et al. ............. 188/218 XL |

FOREIGN PATENT DOCUMENTS

| DE | 10 2004 057752 | 6/2005 |
| EP | 0 287 017 | 10/1988 |
| EP | 0 959 261 | 11/1999 |
| EP | 1 553 322 | 7/2005 |
| WO | WO 2005/088152 A1 | 9/2005 |

* cited by examiner

*Primary Examiner* — Bradley King
*Assistant Examiner* — Vishal Sahni
(74) *Attorney, Agent, or Firm* — Dickstein Shapiro LLP

(57) ABSTRACT

The invention relates to a braking disc comprising a braking band and a support bell. The band comprises first connecting means and the bell comprises second connecting means adapted to face the first connecting means. The disc further comprises coupling means, each of which is slidingly associated to one of either said first or said second connecting means and is adapted to alternatively take either a fastening position or a release position. When the coupling means are in said fastening position mutually fasten the band and the bell in the axial direction. On the other hand, when the coupling means are in said release position, they allow a mutual movement between the band and the bell in the axial direction.

26 Claims, 4 Drawing Sheets

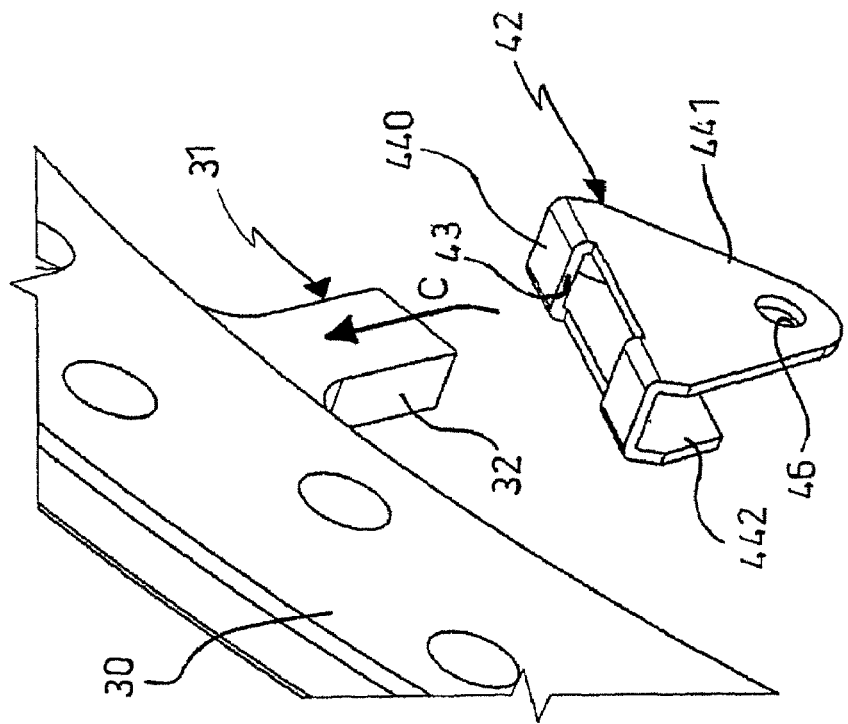
Fig. 2.a
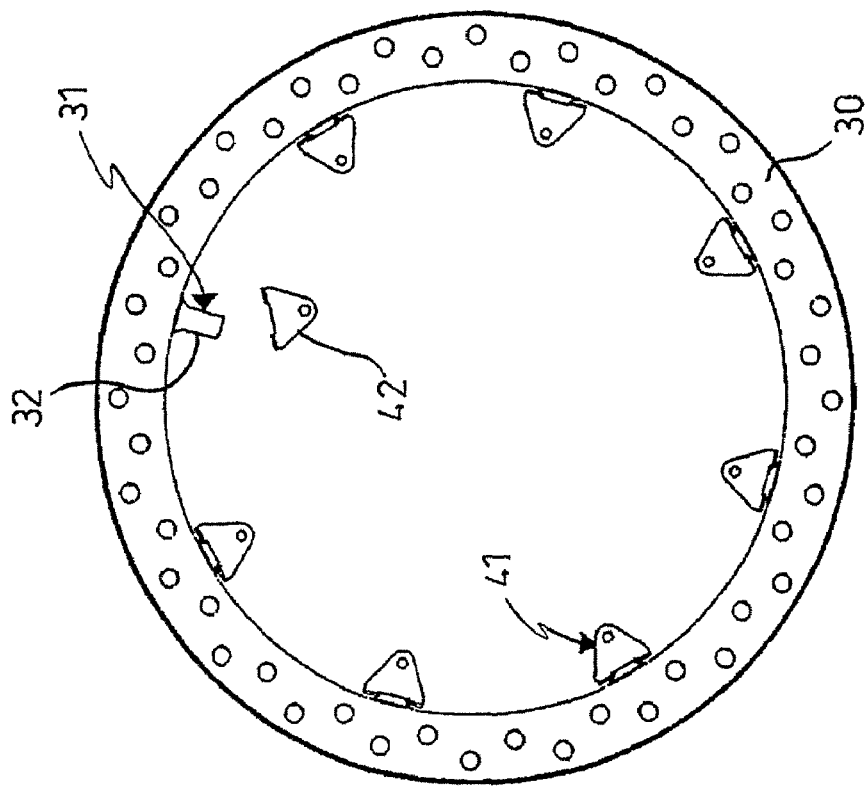
Fig. 2

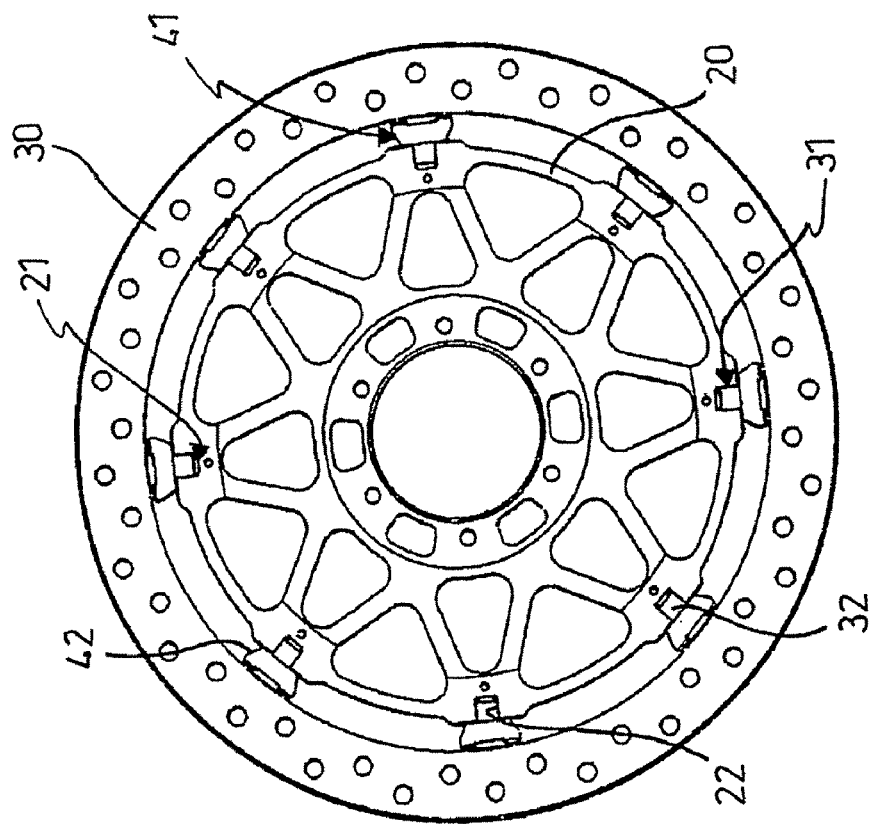
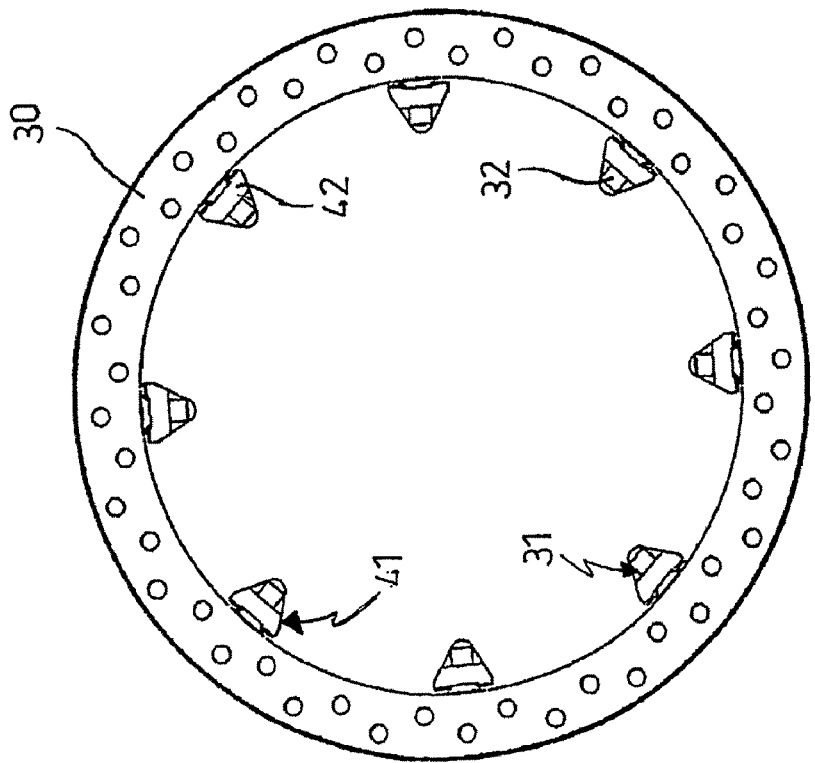

BELL-BAND DRIVE CONNECTION FOR DISC BRAKE

FIELD OF THE INVENTION

The object of the present invention is a braking disc having an improved drive connection between the support bell and the braking band.

BACKGROUND OF THE INVENTION

In the disc brake field, manufacturing of the braking disc in two separate pieces is known and appreciated: the support bell and the braking band.

This technical solution involves considerable advantages. First of all, it allows the braking band, which may reach high temperatures during the braking, to expand without being affected by any constraint imposed by the support bell. Moreover, this solution allows the two pieces to be manufactured in materials which are different from one another and such as to optimize the braking disc overall performance.

The solution selected for the structural connection between the band and the bell also decisively contributes to obtain some advantages.

For example, it is known to obtain the whole braking disc during a single manufacturing process, though using different materials for the band and the bell. This result can be achieved for example by a co-casting process.

It is also known to provide the braking band and the support bell independently from each other in order to subsequently form the braking disc only upon assembling.

This solution involves the use of a so-called drive connection, i.e. of further means adapted to structurally connect the bell and the band, thus ensuring the braking torque transmission and the desired backlashes or gaps.

In some specific fields, for example within the field of the high-performance and competition motorcycles, the drive connections which ensure a considerably easy mounting, besides ensuring all the above advantages, are particularly appreciated.

These drive connections further allow the only braking band to be quickly replaced, for example if the latter is worn, with no need for the support bell to be also replaced.

It is known from US 2005/0145452 a braking disc in which the band and the bell are assembled by means of an axial movement allowing to couple the bell axial protrusions with the band inner radial protrusions. The assembling ends with the application of an elastic retainer which can be locked in position for example by means of riveting. This solution, though requiring a small number of pieces, does not allow an easy assembling of the braking disc and above all it does not allow the disassembling thereof after it has been assembled.

It is also known from PCT WO 2005/088152 a drive connection which uses a plurality of plates, each of which connects a band inner radial protrusion to a bell outer radial protrusion. Each of said plates is fastened by means of two screw-nut screw couplings. A large number of pieces to be assembled and, accordingly, a high complexity of the assembling and disassembling operations of the braking disc derive from this technical characteristic.

OBJECT AND SUMMARY OF THE INVENTION

The object of the present invention is to devise and provide a braking disc having a drive connection between the support bell and the braking band which allows to overcome the drawbacks cited above with reference to the prior art.

Particularly, the task of the present invention is to provide a drive connection which allows a high assembling speed.

Another task of the present invention is to provide a drive connection which allows the number of mechanical pieces used in the connection between the bell and the band to be reduced.

This object and these tasks are achieved by means of a braking disc in accordance with claim 1 and by means of a method of use in accordance with claim 21.

BRIEF DESCRIPTION OF THE DRAWINGS

Further characteristics and the advantages of the braking disc according to the invention will be understood from the description of exemplary embodiments as set forth herein below, which are given by way of indicative and non-limiting example, with reference to the annexed figures, in which:

FIG. 2 shows a braking band upon the assembly of the braking disc according to the invention;

FIG. 2.*a* shows a detail of the braking band from FIG. 2 upon assembly;

FIG. 3 shows the braking band from FIG. 2 upon assembly, as seen from the opposite side relative to the one from FIG. 2;

FIG. 4 shows a braking band and a support bell upon assembly of the braking disc according to the invention;

DETAILED DESCRIPTION OF THE INVENTION

Figure 1:
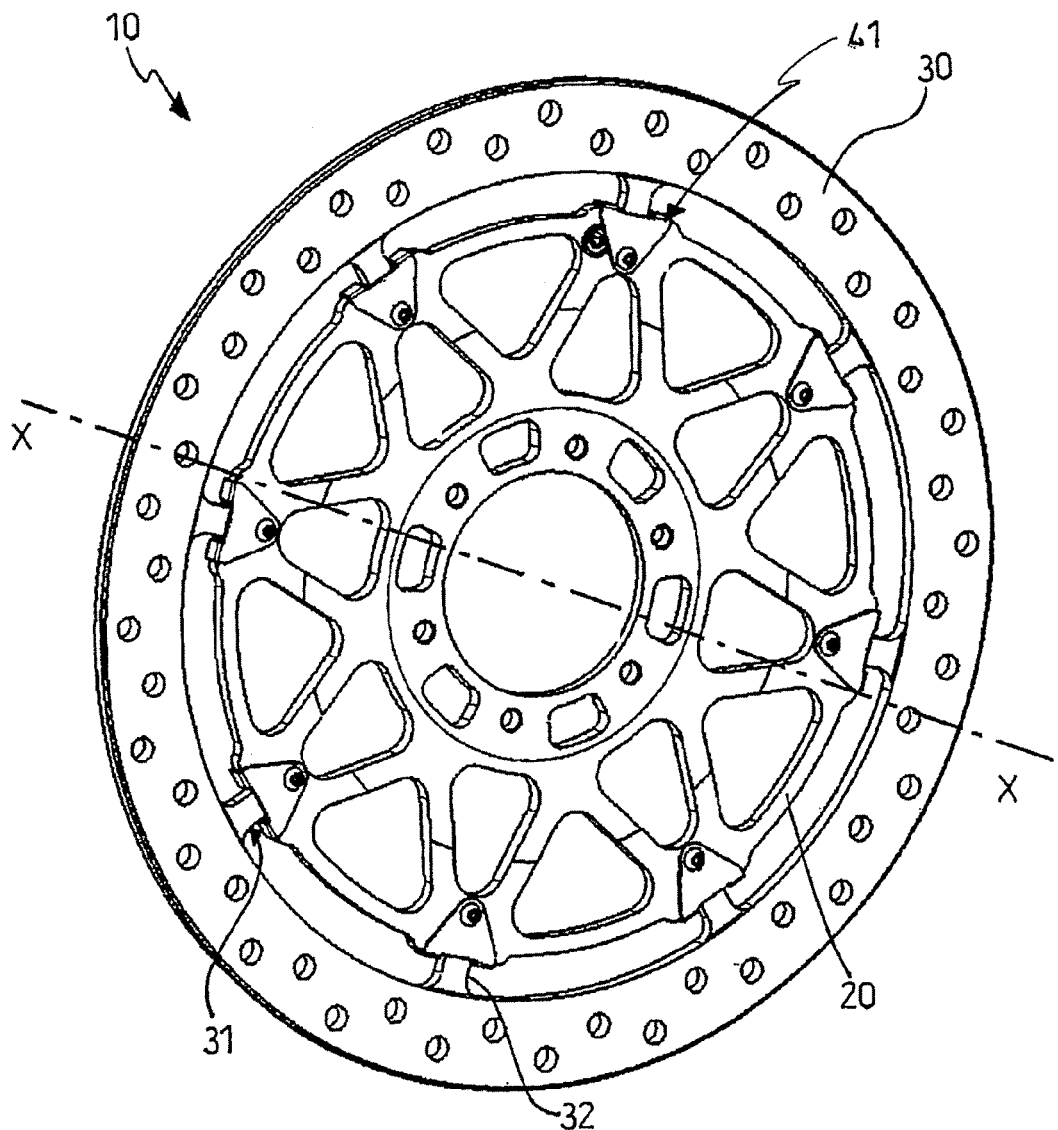
FIG. 1 shows an overall perspective view of a braking disc according to the invention.

With reference to said figures, a braking disc has been generally indicated with 10. The braking disc 10 comprises a support bell (or simply bell) indicated with 20 and a braking band (or simply band) indicated with 30. The braking disc 10 univocally defines an X-axis. The direction of any straight line parallel to X-axis is defined as "axial" herein below. The direction of a half line having its origin in X-axis and perpendicular to the latter is defined as "radial" herein below. Finally, the direction of any straight line tangent to a circumference being centred on X-axis and lying in a plane perpendicular to the latter is defined as "tangential" herein below.

The braking band 30 comprises first connecting means 31. In accordance with an embodiment, the braking band 30 comprises a plurality of first connecting means 31.

The support bell 20 comprises second connecting means 21 adapted to face said first connecting means 31. In accordance with an embodiment, the support bell 20 comprises a plurality of second connecting means 21 adapted to face the plurality of first connecting means 31 of the band 30.

The braking disc 10 further comprises coupling means 41, each of which is adapted to be slidingly associated either to said first connecting means 31 or to said second connecting means 21. In accordance with an embodiment, the braking disc 10 comprises a plurality of coupling means 41.

Figure 5:
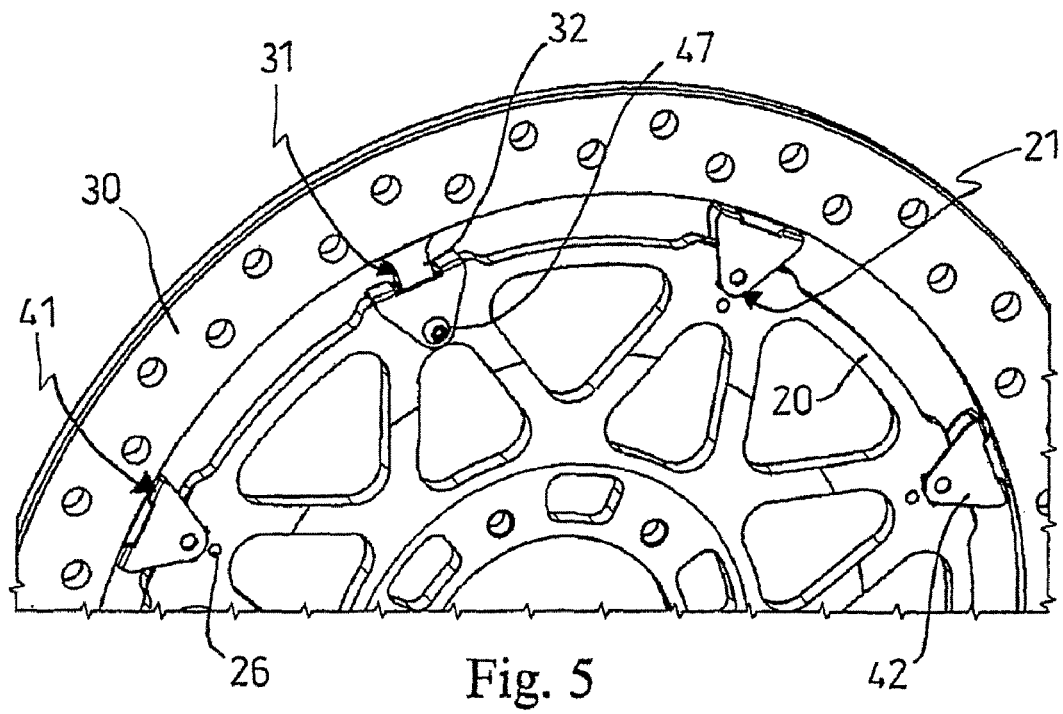
FIG. 5 shows a detail of the drive connection between the bell and the band upon assembly.
Figure 6:
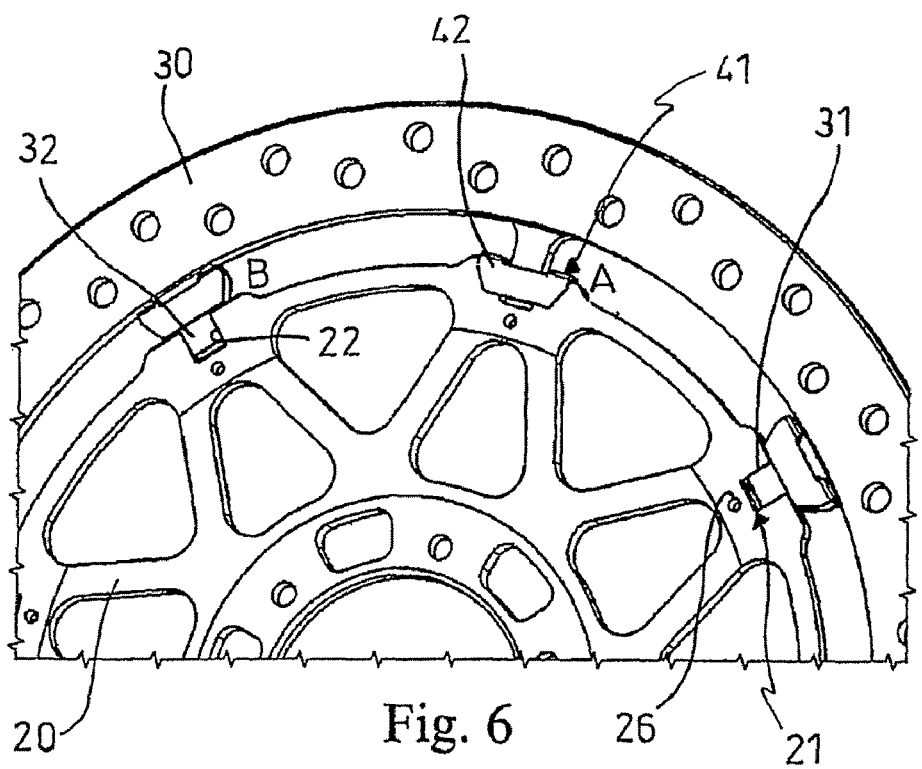
FIG. 6 shows the detail from FIG. 5, as seen from the opposite side relative to the one from FIG. 5.

Each of the coupling means 41 is further adapted to alternatively take either a fastening position (which has been indicated with A in FIGS. 5 and 6) or a release position (which has been indicated with B in FIGS. 5 and 6).

In the fastening position A the coupling means 41 are adapted to mutually fasten the first and second connecting means, 31 and 21 respectively, such as to mutually fasten the braking band 30 and the support bell 20.

Here and herein below, the constraint between the braking band 30 and support bell 20 is meant to be such that a relative movement in the radial direction is however allowed. In fact, this movement allowance is the greatest functional advantage of built-up braking discs as compared with monolithic braking discs.

On the other hand, in the release position B, the coupling means 41 are adapted to mutually release the first and second connecting means, 31 and 21 respectively, such as to allow a mutual movement between the braking band 30 and support bell 20.

In accordance with the embodiment such as illustrated in the annexed figures, the first connecting means 31 comprise a plurality of inner radial protrusions 32 of the band 30.

In accordance with the embodiment such as shown in the annexed figures, the second connecting means 21 comprise a plurality of housings 22 provided on the bell 20. Each of the housings 22 is adapted to accommodate one of the protrusions 32 and the housings 22 on the whole are adapted to accommodate the protrusions 32 on the whole.

In accordance with this embodiment, the protrusions 32 and housings 22 are shaped such that they can be coupled with one another by an axial relative movement between the band 30 and bell 20.

In accordance with the embodiment such as illustrated in FIG. 2.*a* in the annexed figures, the coupling means 41 comprise a plurality of plates 42. Particularly, a plate 42 which is bent such as to form two wings of different length connected with each other by a connecting portion 440 being substantially perpendicular thereto is shown in FIG. 2.*a*: a first longer wing 441 and a second shorter wing 442.

Each plate 42 further comprises a slot 43 on the top of the coupling portion 440. The slot 43 of each plate 42 is capable of accommodating a protrusion 32. Therefore, the plate 42 may be fitted on the protrusion 32 and may be caused to slide along the latter in the radial direction. These movements have been schematically indicated by arrow C from FIG. 2.*a*. Each plate 42 is capable of radially sliding between the fastening position A and the release position B, both indicated in FIGS. 5 and 6, after it has been fitted on a protrusion 32.

Each plate 42 further comprises fastening means 45 adapted to fasten the latter in a desired position, thus preventing unwanted sliding of the plate 42 in the axial and/or radial directions.

It will be schematically described herein below an embodiment of the method for assembling a braking disc comprising a drive connection according to the invention.

First of all, a braking band 30 comprising first connecting means 31 and a support bell 20 comprising second connecting means 21 adapted to face the first connecting means 31 are required to be preset.

Then, the coupling means 41 require to be slidingly associated to one of either the first or second connecting means, either 31 or 21 respectively.

Accordingly, the coupling means 41 have to take a release position B, therefore a mutual movement in the axial direction between the braking band 30 and support bell 20 requires to be imposed. Thereby, the first and second connecting means 31 and 21 face one another.

Finally, the coupling means 41 have to take a fastening position A, such as to mutually fasten the braking band 31 and support bell 21 in the axial direction.

It will be described herein below another embodiment of the method for assembling a braking disc comprising a drive connection according to the invention, in the embodiment such as shown in the annexed figures.

With reference to FIGS. 2 and 2.*a*, a plate 42 is fitted on each of the protrusions 32 of the braking band 30. In this step, it is necessary to maintain the same orientation with all the plates 42 so that the first longer wings 441 are all on the same side of the braking band 30 and, accordingly, the second shorter wings 442 are all on the opposite side of the braking band 30.

With reference to FIG. 3, the plates 42 are radially thrust to the outside, until they reach the release position B.

With reference to FIG. 4, the support bell 20 is coupled with the braking band 30 by an axial movement. Thereby, each protrusion 32 is accommodated in a housing 22.

With reference to FIGS. 5 and 6, each plate 42 is caused to radially slide inwardly, in order to bring the latter from the release position B to the fastening position A.

Finally, the fastening means 45 adapted to fasten the plate 42 in the fastening position A are operated, thus preventing unwanted sliding thereof in the radial direction.

For completeness reasons, it shall be noted now that each plate 42, in the fastening position A, embraces with the wings 441 and 442 the portion of bell which defines the housing 22 thus preventing the plate axial movements. At the same time, the slot 43 embraces the protrusion 32, thus preventing the tangential movements of the plate 42.

With reference again to FIG. 5, the fastening means 45 of the plate 42 comprise a hole 46 provided on the longer wing 441 and a pin 47 adapted to be accommodated in the hole 46. A further hole 26 is provided on the support bell 20. When the plate 42 takes the fastening position A, the axes of the holes 46 and 26 substantially coincide with each other. The introduction of the pin 47 prevents each further movement of the plate 42 in the radial direction.

In accordance with the shown embodiment, the pin is provided by means of a screw 47 which is screwed into the hole 26 being suitably threaded. It can be provided in any case that each screw 47 is screwed into a nut, even if this solution involves a larger number of pieces and hence a higher drive connection overall complication.

FIG. 1 shows the braking disc 10 according to the invention in the use configuration thereof, without the mounting on the vehicle wheel.

As will be now understood by a skilled operator, the embodiment described above allows to obtain many advantages compared to the prior art.

First of all, it allows much simplicity and speed for the assembling and disassembling operations. In fact, the number of mechanical pieces involved in the operations is extremely reduced compared to the known solutions.

Furthermore, this solution allows the braking torque to be directly transmitted from the band 30 to the bell 20, by means of the pressure applied in the tangential direction by the protrusions 32 on the walls of the housings 22. This solution further allows to obtain a wide contact surface, with the subsequent decrease of the local stresses due to the contact between the two specific components.

Therefore, in this force transmission, the coupling means 41 are not involved. The coupling means 41, for example the plates 42, have the only function of controlling the relative movements which could occur between the band 30 and bell 20 in the axial direction within bonds. For this reasons, the coupling means 41 can be sized such as to be simpler and lighter than other elements used in the known solutions with similar functions.

In accordance with a possible alternative embodiment, the first connecting means 31 comprise a plurality of housings provided on the band 30. In accordance with the same embodiment, the second connecting means 21 comprise a plurality of radial protrusions outside the bell 20. Each of the housings is adapted to accommodate one of the protrusions and the housings on the whole are adapted to accommodate the protrusions on the whole.

In accordance with another possible embodiment, the protrusions and/or the housings of the first and/or second connecting means extend in a direction which is different from the radial direction.

In accordance with a possible embodiment of the coupling means 41, they slide along a direction which is different from the radial direction, in order to change from the fastening position to the release position.

In accordance with another embodiment, the coupling means 41 comprise fastening means 45 which are different from the ones described above. For example, the fastening means may comprise either a rivet or a release pin, instead of the screw 47.

To the above-mentioned embodiments of the braking disc, those skilled in the art, in order to satisfy contingent needs, will be able to carry out modifications, adjustments and replacements of elements with other elements being functionally equivalent thereto, without departing from the scope of the claims below. Each of the characteristics described as belonging to a possible embodiment may be provided independently from the other characteristics in other embodiments.

What is claimed is:

1. A disc for a disc brake comprising:
a braking band comprising first connecting means;
a support bell comprising second connecting means adapted to accommodate said first connecting means; and
a plurality of coupling means, each of said coupling means being slidingly associated to one of either said first or said second connecting means and adapted to alternatively slide to either a fastening position (A) or a release position (B), wherein:
said coupling means, in said fastening position (A), are adapted to mutually fasten said first and said second connecting means such as to prevent movement between said braking band and said support bell in an axial direction, and wherein said coupling means is configured to, when in said fastening position (A), embrace the first connecting means such that said coupling means wraps from facing a first axial side of said support bell to facing a second axial side of said support bell opposite the first axial side;
said coupling means, in said release position (B), are adapted to mutually release said first and said second connecting means such as to allow movement between said braking band and said support bell in the axial direction; and
said coupling means are slidingly associated either to said first or said second connecting means in a radial direction and configured to slide between said fastening position (A) and said release position (B).

2. The braking disc according to claim 1, wherein the first connecting means comprise a plurality of inward radial protrusions of the band.

3. The braking disc according to claim 2 wherein the second connecting means comprise a plurality of housings provided on the bell.

4. The braking disc according to claim 3, wherein each of the housings is adapted to accommodate one of the protrusions and the housings on the whole are adapted to accommodate the protrusions on the whole.

5. The braking disc according to claim 3, wherein the protrusions and the housings are shaped such as to be coupled with one another by a relative movement in the axial direction between the band and bell.

6. The braking disc according to claim 1, wherein the coupling means comprise a plurality of plates.

7. The braking disc according to claim 6, wherein each of said plates is bent such as to form two wings connected to each other by a connecting portion being substantially perpendicular thereto.

8. The braking disc according to claim 7, wherein each of the plurality of plates comprises a first wing and a second wing, and wherein the first wing is longer than the second wing.

9. The braking disc according to claim 7, wherein the first connecting means comprises a plurality of inner radial protrusions of the band and each of said plates further comprises a slot on the top of the connecting portion, said slot being adapted to accommodate one of said inner radial protrusions.

10. The braking disc according to claim 6, wherein each plate is adapted to be fitted on a protrusion and to slide along the latter in the radial direction between the fastening position (A) and release position (B).

11. The braking disc according to claim 8, wherein each plate further comprises fastening means adapted to fasten said plate in a desired position, thus preventing unwanted sliding thereof.

12. The braking disc according to claim 11, wherein said fastening means of the plate comprise a first hole provided on the longer wing, a second hole provided on the support bell and a pin adapted to be accommodated in said first and second holes.

13. The braking disc according to claim 12, wherein said second hole is threaded and said pin comprises a screw adapted to be screwed into the second hole.

14. The braking disc according to claim 11, wherein said fastening means comprise either a rivet or a release pin.

15. The braking disc according to claim 1, wherein the first connecting means comprise a plurality of housings provided on the band, and the second connecting means comprise a plurality of outward radial protrusions on the bell, each of the housings being adapted to accommodate one of the protrusions and the housings on the whole being adapted to accommodate the protrusions on the whole.

16. The braking disc according to claim 1, wherein said coupling means slide along a direction which is different from the radial direction, in order to change from the fastening position (A) to the release position (B) and vice versa.

17. A disc brake comprising a disc according to claim 1.

18. A vehicle comprising a disc brake according to claim 17.

19. A method for assembling a braking disc, comprising the steps of:
arranging a braking band comprising a plurality of first connecting means;
arranging a support bell comprising a plurality of second connecting means, wherein each second connecting means is adapted to accommodate one of said first connecting means;
slidingly associating one coupling means of a plurality of coupling means to one of either said first or said second connecting means;
causing said one coupling means to take a release position (B);

imposing a mutual movement between said braking band and said support bell in the axial direction such that said second connecting means accommodates said first connecting means;

causing said coupling means to slide radially into a fastening position (A) such as to mutually fasten said braking band and said support bell in the axial direction, wherein, in said fastening position (A), said coupling means is configured to embrace the first connecting means such that said coupling means wraps from a first axial side of said first connecting means to a second axial side of said first connecting means opposite the first axial side.

20. The method according to claim 19, wherein at least one of said first connecting means and said second connecting means comprises a plurality of inward radial protrusions of the band and said step of slidingly associating one coupling means of a plurality of coupling means to one of either said first or said second connecting means comprises the step of fitting one plate of a plurality of plates on each protrusion.

21. The method according to claim 20, wherein said step of causing said one coupling means to take a release position (B) comprises the step of causing one of said plates to radially slide to the outside.

22. The method according to claim 19, wherein the step of said first and said second connecting means facing each other comprises the step of housing each protrusion in a housing.

23. The method according to claim 20, wherein the step of causing said coupling means to take a fastening position (A) comprises the step of causing each of said plates to radially slide inwardly.

24. The method according to claim 20, further comprising the step of operating fastening means adapted to fasten at least one plate of the plurality of plates in the fastening position (A), thus preventing unwanted sliding thereof.

25. The braking disc according to claim 7, wherein, when the plates are in said fastening position (A), a first wing of the two wings faces a first axial side of the support bell and a second wing of the two wings faces a second axial side of the support bell, opposite the first axial side.

26. The method according to claim 23, wherein the step of causing said coupling means to take a fastening position (A) further comprises causing a first wing of each coupling means to face a first axial side of the support bell and causing a second wing of each coupling means to face a second axial side of the support bell, opposite the first axial side, wherein the first wing and the second wing prevent movement of the braking band relative to the support bell in the axial direction.

* * * * *

UNITED STATES PATENT AND TRADEMARK OFFICE
CERTIFICATE OF CORRECTION

PATENT NO.       : 8,387,760 B2                                       Page 1 of 1
APPLICATION NO.  : 12/159063
DATED            : March 5, 2013
INVENTOR(S)      : Gherardi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 811 days.

Signed and Sealed this
First Day of September, 2015

Michelle K. Lee
*Director of the United States Patent and Trademark Office*